UNITED STATES PATENT OFFICE.

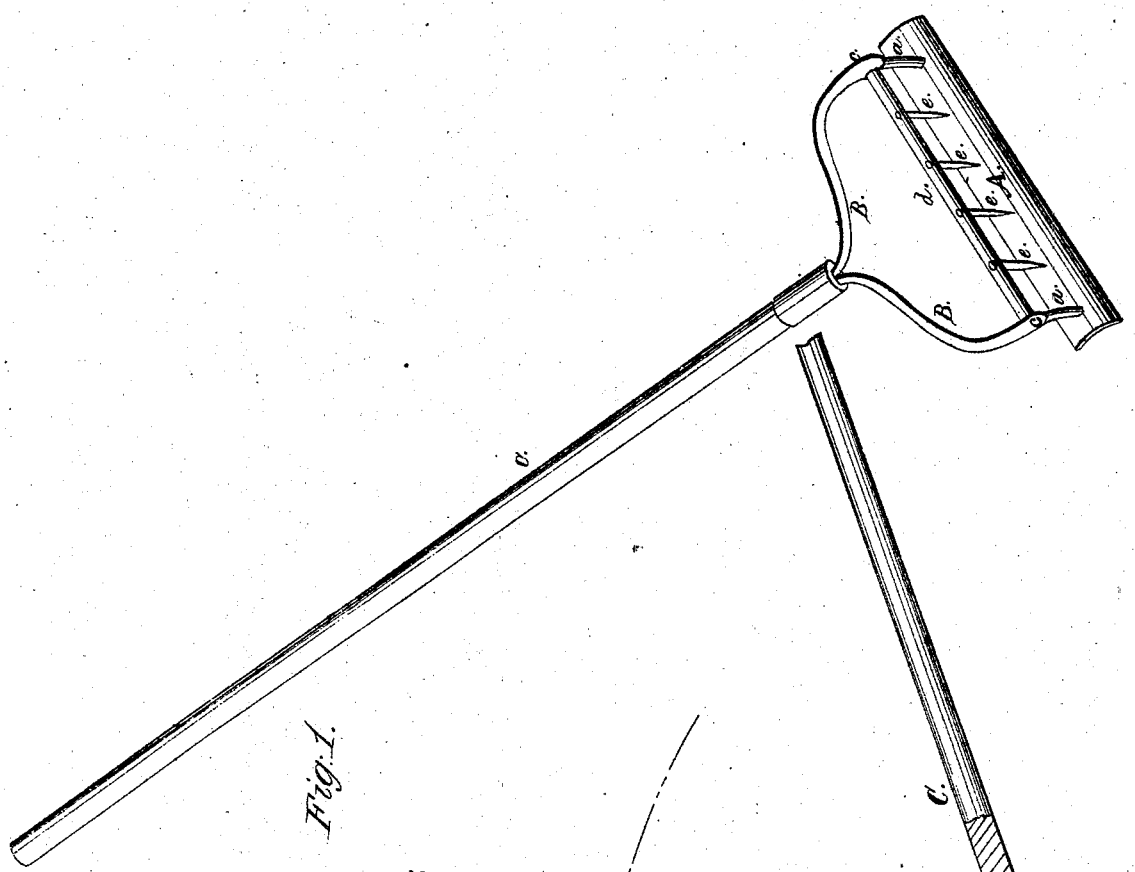

J. D. JENKINS, OF JACKSON, ILLINOIS.

IMPROVEMENT IN SHUFFLE-HOES.

Specification forming part of Letters Patent No. 54,916, dated May 22, 1866.

*To all whom it may concern:*

Be it known that I, J. D. JENKINS, of Jacksonville, in the county of Morgan and State of Illinois, have invented a new and useful Shuffle-Hoe; and I do hereby declare that the following is a full, clear, and exact description thereof, reference being had to the accompanying drawings, making a part of this specification, in which—

Figure 1 is a perspective view of the improved implement. Fig. 2 is a sectional view of the same. Fig. 3 is an enlarged sectional view, showing particularly the hoe-blade.

Similar letters of reference indicate corresponding parts in the several figures.

This invention consists in combining a rake and a hoe in such manner that the former will serve as a means for pulverizing the soil and loosening the earth from the roots of grass and weeds at the same time that the hoe is used for loosening the soil about the roots of plants in fields and gardens. The hoe-blade is so constructed that it will cut both ways and remain sharp for a considerable length of time, and when dull it can be easily sharpened upon a flat or circular grindstone, as will be hereinafter described.

To enable others skilled in the art to understand my invention, I will describe its construction and operation.

In the accompanying drawings, A represents the hoe-blade, which is suitably secured to the curved projections $a$ $a$ of a forked head, B, so that this blade is in a position at right angles, or nearly so, to the length of the handle or staff into the end of which the fork B is secured. This blade A is concave on its under side and convex on its upper side, and its front and back edges are both sharpened, so that the implement can be used with a shuffling movement. This blade is made concave on its under side for two purposes—first, that it will enter and leave the soil readily, it having an inclined pitch in two directions, and, secondly, that its front and rear edges may be easily and quickly sharpened upon a flat or circular stone.

If the blade A were not concave on its bottom side, it will be readily seen that its back edge would not perform the office of cutting, and it would operate like any ordinary thrust-hoe blade or dibble.

The handle or staff C inclines toward the blade A in such a degree that the two cutting-edges can be kept down and caused to enter the soil without requiring the person using the implement to stoop much.

Two offsets, $c$ $c$, project up from the curved projections $a$ $a$ of the forked arms B, and have a transverse bar or rake-head, $d$, suitably secured to them, which is provided with a number of teeth, $e$ $e$ $e$, that project down nearly to the upper surface of the plate A. These teeth may be made round and pointed, or they may be made with their front and rear edges sharp for cutting and tearing roots and sods.

The position of the rake-teeth over the hoe-plate A will cause them to operate upon the soil which passes over the plate A and to pulverize the soil, cut and loosen earth from the roots of weeds, and leave the latter upon the surface to decay.

Having thus described my invention, what I claim as new, and desire to secure by Letters Patent, is—

1. The combination of a rake and a hoe-blade, A, when arranged to operate substantially as described.

2. Making the blade A with a concave bottom surface and connecting this blade to the forked head at a point which is beneath the rake-teeth, substantially as described.

J. D. JENKINS.

Witnesses:
 EDWARD P. KIRBY,
 MARCUS HOOK.